(12) United States Patent
Singh et al.

(10) Patent No.: US 9,832,121 B1
(45) Date of Patent: Nov. 28, 2017

(54) NEXT HOP INSTRUCTION ASSOCIATIONS FOR FORWARDING UNIT PROGRAMMING WITHIN A NETWORK DEVICE

(71) Applicant: Juniper Networks, Inc., Sunnyvale, CA (US)

(72) Inventors: Ravi Singh, San Jose, CA (US);
Raveendra Torvi, Nashua, NH (US);
Ronald P. Folkes, Dallas, TX (US);
Alia K. Atlas, Arlington, MA (US);
Navaneetha Krishnan V, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 323 days.

(21) Appl. No.: 14/587,563

(22) Filed: Dec. 31, 2014

(51) Int. Cl.
*G06F 15/173* (2006.01)
*H04L 12/741* (2013.01)
*H04L 12/803* (2013.01)

(52) U.S. Cl.
CPC .......... *H04L 45/745* (2013.01); *H04L 47/122* (2013.01)

(58) Field of Classification Search
CPC . H04L 12/4633; H04L 41/0668; H04L 45/00; H04L 45/02; H04L 45/306; H04L 45/457; H04L 47/122
USPC ............... 370/217, 225, 228, 238, 389, 392
See application file for complete search history.

(56) References Cited

U.S. PATENT DOCUMENTS

| | | | |
|---|---|---|---|
| 7,035,256 B1 * | 4/2006 | Neufeld | H04L 45/00 370/389 |
| 7,215,637 B1 | 5/2007 | Ferguson et al. | |
| 7,489,681 B1 * | 2/2009 | Aggarwal | H04L 45/7457 370/389 |
| 7,990,993 B1 | 8/2011 | Ghosh et al. | |
| 8,050,559 B2 | 11/2011 | Sindhu | |
| 8,077,726 B1 | 12/2011 | Kumar et al. | |
| 8,139,492 B1 * | 3/2012 | Peterson | H04L 45/00 370/238 |
| 8,806,058 B1 | 8/2014 | Mackie et al. | |
| 2005/0111351 A1 * | 5/2005 | Shen | H04L 45/02 370/217 |
| 2007/0091793 A1 * | 4/2007 | Filsfils | H04L 12/4633 370/228 |
| 2011/0069706 A1 * | 3/2011 | Sen | H04L 45/00 370/392 |
| 2014/0269261 A1 * | 9/2014 | D'Souza | H04L 41/0668 370/225 |
| 2015/0016456 A1 * | 1/2015 | Ramanathan | H04L 45/306 370/392 |

(Continued)

OTHER PUBLICATIONS

Pan et al., "Fast Reroute Extensions to RSVP-TE for LSP Tunnels," Network Working Group, rfc 4090, Standards Track, May 2005, 39 pp.

*Primary Examiner* — Dustin Nguyen
(74) *Attorney, Agent, or Firm* — Shumaker & Sieffert, P.A.

(57) ABSTRACT

In some examples, a network device of a network comprises a first component configured to store a plurality of next hop instructions corresponding to respective logical or physical network structures of the network. The network device also comprises a second component configured to send, to the first component, a message that identifies an association of the plurality of next hop instructions, wherein the first component is further configured to modify, in response to receiving the message, each of the plurality of next hop instructions.

21 Claims, 7 Drawing Sheets

(56) References Cited

U.S. PATENT DOCUMENTS

2015/0350060 A1\* 12/2015 Patil ..................... H04L 47/122
370/238

\* cited by examiner

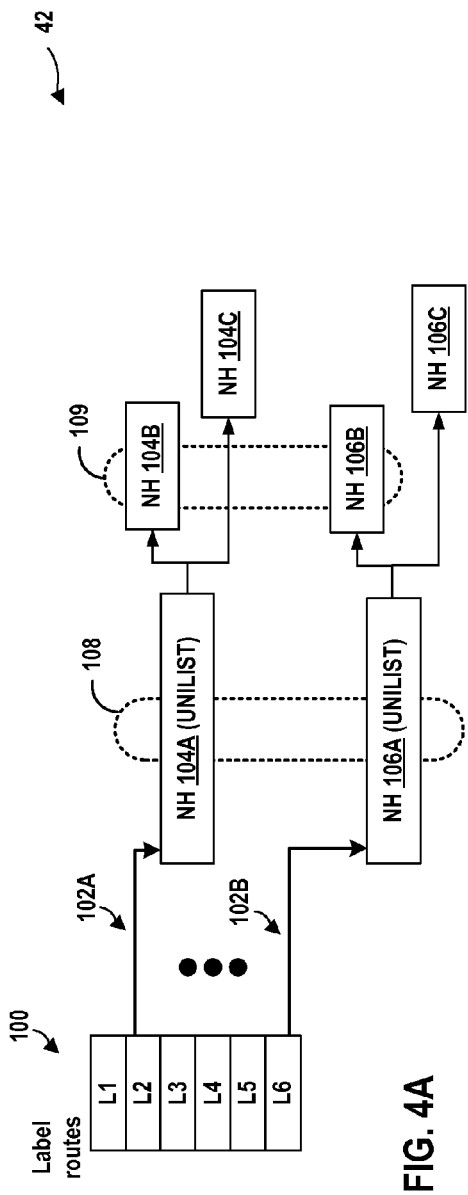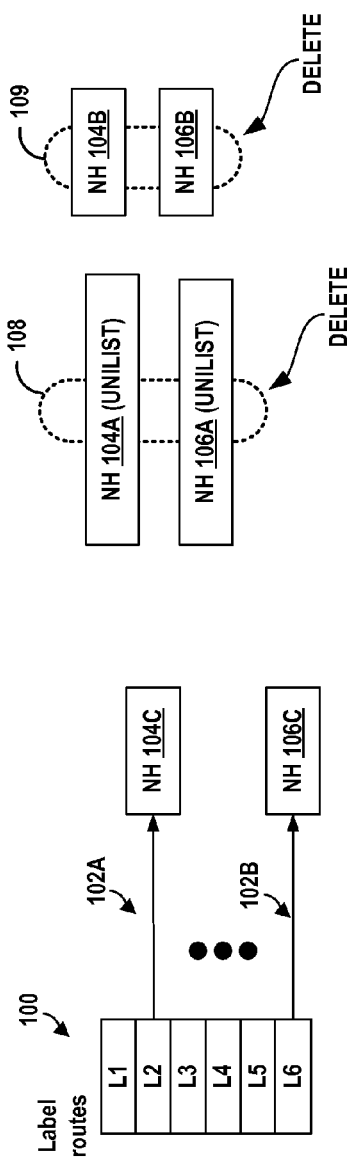
FIG. 4A
FIG. 4B

NEXT HOP INSTRUCTION ASSOCIATIONS FOR FORWARDING UNIT PROGRAMMING WITHIN A NETWORK DEVICE

TECHNICAL FIELD

The disclosure relates to packet-based computer networks and, more particularly, to forwarding packets within computer networks.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and hardware-based packet processors for routing or switching data units. In some cases, for example, a network device may include one or more forwarding units (also referred to as "packet forwarding engines" (PFEs)) and a switch fabric that collectively provide a data plane (also referred to as "forwarding plane") for forwarding network traffic.

The control plane functions provided by the control unit include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that includes a number of forwarding structures generated by the control unit in accordance with the routing information and control information. The control unit installs the forwarding structures within the data plane to programmatically configure the hardware-based packet processors. The data structures and next hop instructions that constitute the forwarding structures define an internal forwarding path for each incoming packet received by the network device. For example, to generate a route table lookup forwarding structure, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding structures including next hop instructions into respective FIBs within the forwarding units and in this way control traffic forwarding within the data plane. Bifurcating control and data plane functionality allows the FIB in each of forwarding units to be updated without degrading packet forwarding performance of the network device and allows packet forwarding to continue independent of control plane performance degradation or failure.

SUMMARY

In general, techniques are described for using identifying and using associations among logical network structures of a network to manipulate, as a group, next hop instructions ("next hops") corresponding to the logical network structures and programmed within a network device data plane. For example, a network of interconnected network devices may establish multiple label-switched paths (LSPs). In this example, a data plane of a network device for the LSPs (e.g., a label edge router or label switching router) is programmed with respective sets of next hops that enable the data plane to process packets mapped to the LSPs. The LSPs may in some cases share, at the network device, a common attribute such as a bypass LSP, outbound interface, outbound next hop device, or outbound tunnel. In accordance with the techniques described herein, the network device determines, from this common attribute, that an association can be constructed for the LSPs of the network.

For example, the network device may create an association of the respective next hops for the LSPs that implement the common attribute. That is, the network device may implement, in part, the LSPs using respective next hops (i.e., at least one per LSP) that cause the network device to transmit labeled packets for the LSPs on a common outbound interface. The network device creates and stores an association of these next hops to, e.g., a memory of the network device. Subsequently, components of the network device may signal one another to modify or delete the next hops by referencing an identifier for the association, rather than by separately sending an identifier for each of the next hops in the association. For instance, the network device may configure multiple new LSPs to replace the LSPs, the new LSPs having a different outbound interface. After switching over the traffic to the new LSPs from the now-defunct LSPs, a control plane component of the network device may signal a data plane component (or another control plane component) to delete all of the next hops from its memory by reference to the identifier for the association constructed for the set of LSPs. As a result, the control plane component may avoid separately signaling the deletion of each of the next hops and thereby reduce the amount of inter-component signaling. The techniques of this disclosure may in this way scale the creation, modification, and deletion of logical network structures of the network, such as LSPs and other tunnels.

In one aspect, a method includes storing, by a first component of a network device of a network, a plurality of next hop instructions corresponding to respective logical or physical network structures of the network; sending, by a second component of the network device to the first component of the network device, a message that identifies an association of the plurality of next hop instructions; and modifying, by the first component of the network device in response to receiving the message, each of the plurality of next hop instructions.

In another aspect, a network device of a network comprises a first component configured to store a plurality of next hop instructions corresponding to respective logical or physical network structures of the network; and a second component configured to send, to the first component, a message that identifies an association of the plurality of next hop instructions, wherein the first component is further configured to modify, in response to receiving the message, each of the plurality of next hop instructions.

In another aspect, a non-transitory computer-readable medium comprising instructions for causing at least one programmable processor of a network device of a network to store, by a first component of the network device, a plurality of next hop instructions corresponding to respective logical or physical network structures of the network;

send, by a second component of the network device to the first component of the network device, a message that identifies an association of the plurality of next hop instructions; and modify, by the first component of the network device in response to receiving the message, each of the plurality of next hop instructions.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A-4C are block diagrams illustrating the modification of a forwarding information base by collective modification of an association of next hops, according to techniques described herein.

Like reference characters denote like elements throughout the figures and text.

DETAILED DESCRIPTION

Figure 1:
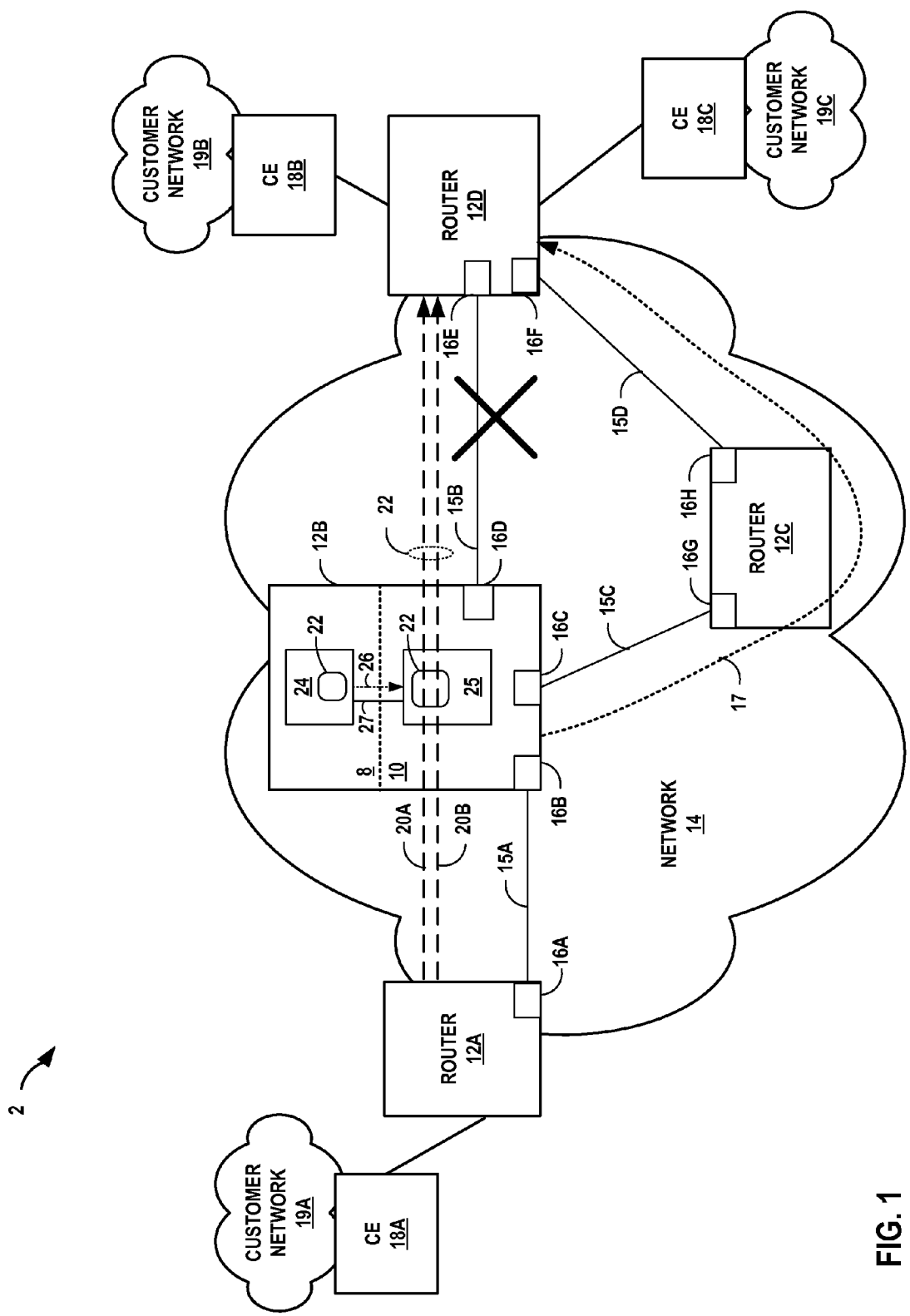
FIG. 1 is a block diagram illustrating an example network system 2 in which routers 12A-12D ("routers 12") of network 14 are configured to forward network traffic (e.g., network packets) and in which router 12B operates to perform bulk manipulation of next hops, according to techniques described in this disclosure.

FIG. 1 is a block diagram illustrating an example network system 2 in which routers 12A-12D ("routers 12") of network 14 are configured to forward network traffic (e.g., network packets) and in which router 12B operates to perform bulk manipulation of next hops, according to techniques described in this disclosure. In this example, routers 12A and 12D are edge routers of a network 14, which may be administered by a network service provider to provide connectivity for customer networks 19A-19C ("customer networks 19"). In particular, edge routers 12A and 12D are coupled to customer edge (CE) routers 18A-18C ("CE routers 18") of customer networks 19 via access links. Edge routers 12A and 12D communicate with CE routers 18 to provide customer networks 19 with access to network 14.

As shown, each of customer networks 19 may be a network for a site of an enterprise. Each of customer networks 19 may include one or more computing devices (not shown), such as personal computers, laptop computers, handheld computers, workstations, servers, switches, printers, or other devices. Network 14 may be a service provider network coupled to one or more networks administered by other service providers, and may thus form part of a large-scale public network infrastructure, e.g., the Internet. Customer networks 19 may be considered as edge networks of the Internet. The service provider may provide computing devices within customer networks 19 with access to the Internet via network 14, which allows computing devices within one of customer networks 19 to communicate with computing devices within the Internet or the other one of customer networks 19. FIG. 1 may be a simplified view of network 14. Network 14 may include a variety of other network devices (not shown), such as routers, switches, servers, and the like and may be connected to other networks.

In this example, routers 12 are interconnected by physical links 15A-15D ("links 15") coupled to routers 12 by interface ports 16A-16H ("interface ports 16"). The physical links 15 may be a physical medium, such as a copper wire, a coaxial cable, any of a host of different fiber optic lines, or a wireless connection. Interface ports 16 may each be associated with a different identifier, such as an Internet Protocol (IP) address. For example, interface port 16E of router 12D may be associated with a first IP address, while interface port 16F of router 12D is associated with a second IP address different from the first IP address.

In order to maintain an accurate representation of the network 14, routers 12 exchange routing information using control-plane signaling in accordance with one or more defined protocols, such as the Border Gateway Protocol (BGP). When routers of different autonomous systems use BGP to exchange information, the protocol is referred to as External BGP (EBGP). When routers within an autonomous system use BGP to exchange routing information, the protocol is referred to as Internal BGP (IBGP). Another example protocol for exchanging routing information is the Intermediate System to Intermediate System protocol (ISIS), which is an interior gateway routing protocol for IP networks for communicating link-state information within an autonomous system. Other examples of interior routing protocols include the Open Shortest Path First (OSPF), and the Routing Information Protocol (RIP).

When two of routers 12 initially connect, they typically exchange their routing information. The routers 12 send control messages to incrementally update the routing information when the network topology changes. For example, the routers 12 may send update routing protocol messages to advertise newly available routes and to withdraw routes that are no longer available. Routers 12 may maintain the routing information in the form of one or more routing tables or other data structures. The form and contents of the routing tables depends on the routing algorithm implemented by the routers 12. Furthermore, as described in further detail below, routers 12 generate and maintain forwarding information in accordance with the routing information. The forwarding information for a router 12 associates network routes with specific next hop devices and corresponding interface ports of the router 12. The forwarding information may, therefore, be considered a subset or digest of the information contained within routing information. The process of generating the forwarding information is generally referred to as route computation, which may involve route resolution.

In the example of FIG. 1, a Multiprotocol Label Switching (MPLS) fast reroute bypass tunnel 17 exists over routers 12B, 12C, and 12D. Bypass tunnel 17 is a label switched path (LSP) that provides link protection for link 15B between router 12B and router 12D, such that if link 15B should fail, router 12B can tunnel network traffic mapped to either of LSPs 20A-20B ("LSPs 20") through bypass tunnel 17. Router 12B may establish bypass tunnel 17 in accordance with MPLS fast reroute techniques, as described in P.

Pan, Fast Reroute Extensions to RSVP-TE for LSP Tunnels, Network Working Group RFC 4090, May 2005, the entire content of which is incorporated by reference herein. Fast reroute for LSPs is described in U.S. Pat. No. 8,077,726, issued Dec. 13, 2011 and entitled "Fast Reroute for Multiple Label Switched Paths Sharing a Single Interface," the entire contents of which being incorporated herein by reference.

As the point of local repair (PLR) and ingress of bypass tunnel 17, router 12B may establish bypass tunnel 17 to protect existing LSPs 20 that traverse router 12B and do not traverse links 15C and 15D. Router 12B may establish bypass tunnel 17 upon request by an ingress router of one of these protected LSPs. After router 12B establishes bypass tunnel 17, router 12B maintains forwarding information in data plane 10 of router 12B that allows router 12B to send traffic through bypass tunnel 17 if link 15B fails, as described in further detail below. In some examples, router 12B may establish separate bypass tunnels for each of LSPs 20A-20B. Bypass tunnel 17 may exist in the absence of any existing LSP protected by bypass tunnel 17.

Router 12A operates as an ingress router for the network 14 to initiate establishment of an explicitly-routed LSP 20, e.g., using the Resource Reservation Protocol with Traffic-Engineering Extensions (RSVP-TE). As one example, router 12A may be establishing the LSP 20 to carry L2 communications from customer network 19A to customer networks 19B, 19C in the form of MPLS packets that enter LSP 20 at ingress router 12A and exit the LSPs at egress router 12D. LSP 20 will be a new LSP other than the already-established LSPs protected by bypass tunnel 17. Although in this example, router 12A is depicted as an edge router and described as an ingress router of the network 14, router 12A may in other examples be a core or transit router of network 14 that establishes LSPs within the network 14 and operates as an transit label edge router (LER) for such LSPs. Also, while router 12B is depicted as a core router of network 14, router 12B may in some examples be an edge router of network 14.

Router 12B of network system 2 is logically and/or physically partitioned into control plane 8 and data plane 10. Control plane 8 includes a control unit 24 comprising hardware and software components that execute RSVP-TE and other network protocols (illustrated as "protocols") to exchange network packets with other routers 12 to perform control plane functions of router 12B. Control plane functions of control plane 8 may include exchanging routing information with other network devices, maintaining peering sessions for routing protocols to enable continued exchange of routing information, responding to Address Resolution Protocol (ARP) requests, receiving and responding to configuration requests, establishing Label Switched Paths (LSPs) and reserving resources for LSPs (e.g., using RSVP-TE), exchanging multicast information with peers, and handling network packets having expired Time-to-Live values, for instance. Based on control or "messaging" or "signaling" information received in protocol messages for protocols from routers 12, control unit 24 updates a configuration for data plane 10 of router 12B to direct forwarding of network packets by the data plane 10.

Data plane 10 (alternatively referred to as a "forwarding plane") represents hardware or a combination or hardware and software that processes and forwards network traffic in accordance with a configuration updated by control unit 24. This configuration includes a forwarding information base (FIB) that itself includes a number of next hops generated by the control unit 24 in accordance with routing information and control information. These next hops may be alternatively referred to as a "forwarding next hops" and are distinguished from next hop devices for particular routes. That is, data plane 10 processes packets in accordance with a next hop instruction.

Data plane 10, in this example, includes a packet forwarding unit 25 (or more simply, "forwarding unit 25") that provides high-speed forwarding of network traffic received by router 12B at interface port 16B, for instance. Forwarding unit 25 may represent or include a hardware-based packet processor, such as a forwarding Application-Specific Integrated Circuit (ASIC) and/or other logic that is programmable to forward network traffic in accordance with routing, management, and other control information received by the execution of protocols by control unit 24 or by a management interface to control unit 24, for instance. Forwarding unit 25 may alternatively be referred to as a packet forwarding engine (PFE). In some examples, forwarding unit 25 is integrated as a software component or is otherwise executed by control unit 24. Example details of a network device in which a control plane programs a data plane with forwarding structures including next hop instructions are described in U.S. Pat. No. 8,806,058, issued Aug. 12, 2014, and entitled "PACKET FORWARDING PATH PROGRAMMING USING A HIGH-LEVEL DESCRIPTION LANGUAGE," which is incorporated by reference herein in its entirety.

Next hops programmed in the data plane 10 include next hops for processing packets mapped to LSPs 20 and received by router 12B. These next hops may include a separate set of next hops (or "next hop chain") for the forwarding unit 25 for each of LSPs 20 to swap the inbound label with the outbound label for the LSP. The next hops may further cause the forwarding unit 25 to, when executed in the event of the failure of link 15B (as shown in FIG. 1), switch traffic over to the bypass LSP 17, which involves swapping the inbound label for the inbound label expected at the merge point for the bypass LSP 17 and primary LSP 20A (router 12D in this example), followed by pushing the bypass label for LSP 17 onto the packet label stack.

In this respect, bypass LSP 17 and outbound link 15B are common attributes for the logical network structures, LSPs 20. In other words, LSPs 20 as logical network structures have the common attributes of bypass LSP 17 and outbound link 15B.

In accordance with the techniques described in this disclosure, control unit 24 associates multiple next hops for logical network structures having a common attribute into an association. The control unit 24 is then able to signal the forwarding unit 25 to manipulate the multiple next hops in the association by sending an identifier for the association ("association identifier") rather than identifiers for each of the multiple next hops.

In the example of FIG. 1, control unit 24 associates respective next hops for LSPs 20 having the common attributes into association 22. In other words, association 22 includes respective next hops for LSPs 20. Although multiple next hops which together make up a next hop chain for forwarding path for LSP 20A, e.g., may be installed to forwarding unit 25, the association 22 may include fewer than all such next hops for LSP 20A. Control unit 24 sends, via communication link 27, the multiple next hops to forwarding unit 25 for installation and includes the identifier for the association. In this way, forwarding unit 25 stores the identifier and the association for the multiple next hops for LSPs 20. Communication link 27 represents a physical communication link, such as a 100 Mbps Ethernet link.

Subsequently, control unit 24 may signal the manipulation of the multiple next hops for respective LSPs 20 as a group by sending, to forwarding unit 25, the association identifier for the association 22 along with an instruction to be performed by forwarding unit 25 with respect to the next hops in the association 22. The instruction may include a delete, update/change/modify, or add instruction in various instances.

In the illustrated example, control unit 24 sends instruction 26 to forwarding unit 24. Instruction 26 includes a delete instruction and the association identifier for association 22 as part of local repair for LSPs 20 or global repair for new instances of LSPs 20 that results in breaking the old instances. In response to receiving and processing the instruction 26 that includes the association identifier, forwarding unit 24 deletes each of the multiple next hops in the association 22 identified by the association identifier. At least in some instances, instruction 26 does not include identifiers for any of the multiple next hops to be deleted.

By sending an instruction with the association identifier in this way, e.g., using instruction 26, the control unit 24 may avoid separately sending an instruction for each of the multiple next hops and thus reduce messaging overhead in both the control unit 24 and forwarding unit 25, as well as on the communication link 27. Because handling message traffic on the communication link 27 can be a bottleneck to the repair, creation, and deletion of logical network structures, reducing the messaging overhead may ameliorate this bottleneck and increase the amount of computing resources available to forwarding unit 25 and/or control unit 24 to execute the instruction versus handling communications. Router 12B may, as a result, more quickly conform the FIB of data plane 10 to the computed state, as determined by control plane 8, which may improve the stability of the network 14 overall. With regard to LSPs in particular, because network 14 may in some cases include hundreds or even thousands of LSPs that traverse router 12B and link 15B, quickly transitioning and/or cleaning up state for such LSPs when link 15B or other common attribute for the LSPs changes facilitates fast reroute and global repair of the LSPs.

Figure 2:
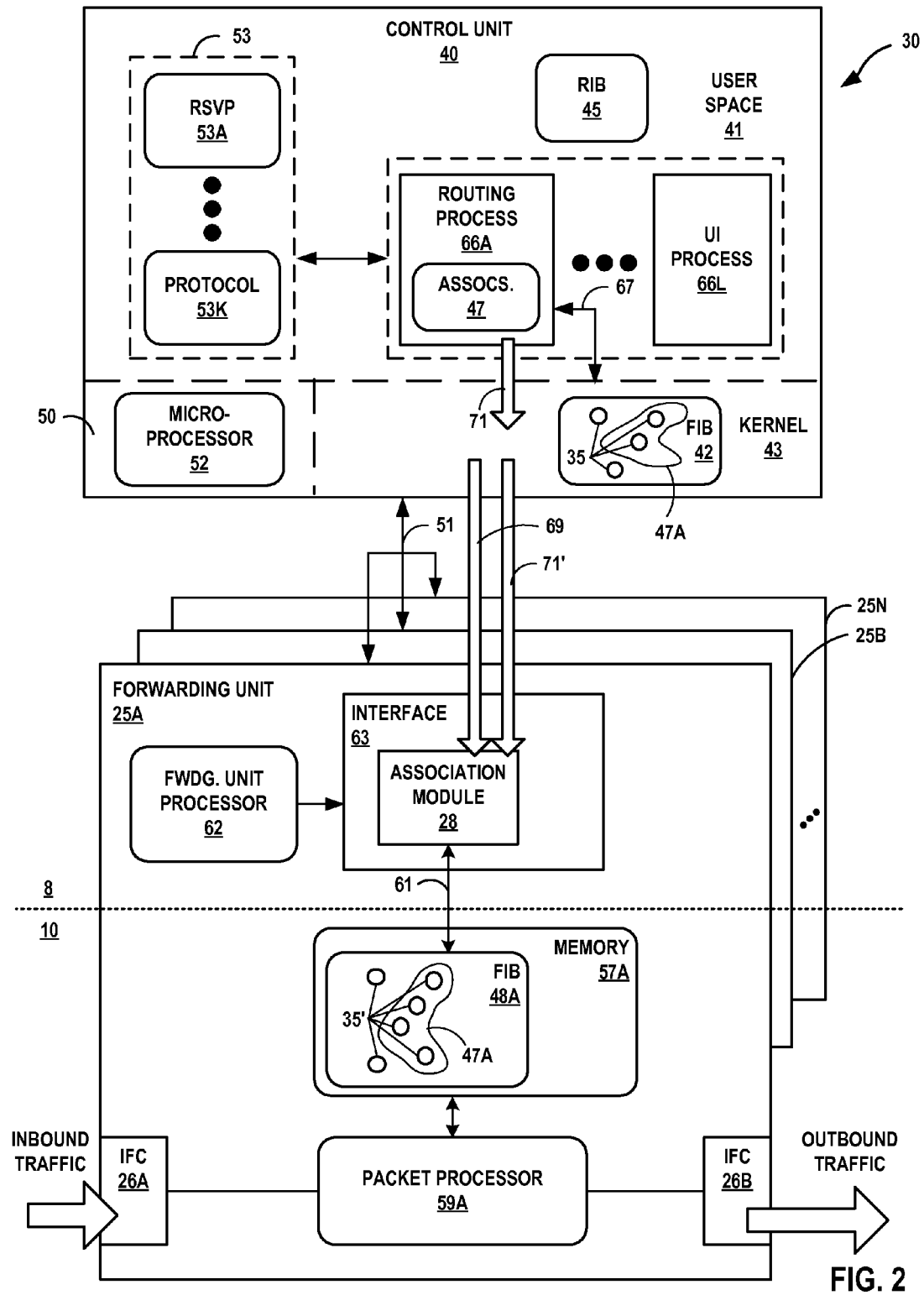
FIG. 2 is a block diagram illustrating, in detail, components of an example network device that signal and perform operations with respect to associations of multiple next hops, as described herein.

FIG. 2 is a block diagram illustrating, in detail, components of an example network device that signal and perform operations with respect to associations of multiple next hops, as described herein. Network device 30 illustrated in FIG. 2 may represent an example instance of router 12B of FIG. 1.

In this example, control unit 40 includes a combination of hardware and software that provides a control plane 8 operating environment for execution of various user-level host processes 66A-66L (collectively, "host processes 66") executing in user space 41. By way of example, host processes 66 may include a command-line interface and/or graphical user interface process 66L to receive and respond to administrative directives in accordance with one or more of protocols 53, a routing process 66A to execute one or more routing protocols of protocols 53 including RSVP 53A, a network management process to execute one or more network management protocols of protocols 53, an ARP process to respond to ARP requests according the ARP protocol of protocols 53, a subscriber management process to manage subscriber session setup and maintenance in accordance with one or more subscriber session management protocols, and so forth. In this respect, control unit 40 may provide routing plane, service plane, and management plane functionality for network device 30.

Host processes 66 execute on and interact with kernel 43, which provides a run-time operating environment for user-level processes. Kernel 43 may represent, for example, a UNIX operating system derivative such as Linux or Berkeley Software Distribution (BSD). Kernel 43 offers libraries and drivers by which host processes 66 may interact with the underlying system. Hardware environment 50 of control unit 40 includes microprocessor 52 that executes program instructions loaded into a main memory (not shown in FIG. 2) from a storage device (also not shown in FIG. 2) in order to execute the software stack, including both kernel 43 and user space 41, of control unit 40. Microprocessor 52 may represent one or more general- or special-purpose processors such as a digital signal processor (DSP), an application-specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, routing process 66A executes one or more interior and/or exterior routing protocols to exchange routing information with other network devices and store received routing information in routing information base 45 ("RIB 45"). Routing process 66A in this example executes RSVP 53A to setup and tear-down LSPs. RSVP 53A may represent the RSVP with traffic engineering extensions (RSVP-TE) protocol. RIB 45 may include information defining a topology of a network, including one or more routing tables, link-state databases, and/or traffic engineering databases. Routing process 66A resolves the topology defined by routing information in RIB 45 to select or determine one or more active routes through the network and then installs these routes to forwarding information base 42 ("FIB 42"), which is stored by kernel 43 that is responsible for synchronizing the FIB 42 (the master copy of the network device 30 FIB) with FIBs 48A-48N on respective forwarding units 25A-25N. In some cases, FIB 42 includes a separate FIB copy corresponding to each of FIBs 48A-48N. FIB 42 may alternatively be referred to as a "software FIB" or "kernel FIB," for the FIB 42 is managed by software components of the control plane, including kernel 43. Each of FIBs 48A-48N may alternatively referred to as a "hardware FIB," in that it is stored to memory accessible to a hardware-based packet processor 59A.

In some cases, FIB 42 may be generated and managed by a user space process, e.g., routing process 66A, which may communicate forwarding structures to kernel 43 by a socket 67 or other communication channel. Typically, the routing process 66A generates forwarding structures of FIB 42 to include a radix or other lookup tree to map packet information (e.g., header information having destination information and/or a label stack) to next hop devices and ultimately to interface ports of interface cards associated with respective forwarding units 25A-25N. In addition to generating and providing lookup data structures such as the aforementioned radix or lookup tree, routing process 66A may generate and provide next hop instructions 35 for installation to FIB 42 and eventual provisioning to FIBs 48A-48N. Next hop instructions 35 are described in further detail below.

Network device 30 also includes a plurality of forwarding units 25A-25N (collectively, "forwarding units 25") and a switch fabric (not shown) that together provide the data plane 10 for forwarding network traffic. Forwarding units 25 connect to control unit 40 in this example by communication links 51, which may represent an Ethernet network. Each of forwarding units 25 may represent an example instance of forwarding unit 25 of FIG. 1. Communication links 51 may represent an example instance of communication link 27 of FIG. 1.

Each of forwarding units 25 may include substantially similar components performing substantially similar functionality, said components and functionality being described hereinafter primarily with respect to forwarding unit 25A illustrated in detail in FIG. 2. Forwarding unit 25A receives and sends network packets via interfaces of interface cards (IFCs) 26A, 26B of forwarding unit 25A. Forwarding unit 25A also includes hardware-based packet processor 59A and memory 57A, which represents hardware or a combination of hardware and software that provide high-speed forwarding of network traffic, as described in further detail below. Likewise, forwarding unit 25B includes packet processor 59B and memory 57B, and so on. Each of forwarding units 25 includes an instance of forwarding unit processor 62 and interface 63. Forwarding unit 25A may include multiple packet processors 59A that provide data plane 10 in cooperation with other packet processors 59 on other forwarding units 25. In some examples, one or more of forwarding units 25 may each include at least one packet processor substantially similar to packet processor 59. Example instances of forwarding unit 25A may include flexible programmable integrated circuit (PIC) concentrators (FPCs), dense port concentrators (DPCs), and modular port concentrators (MPCs). In some instances, forwarding units 25 may or include represent line cards.

Each of IFCs 26A, 26B may include interfaces for various combinations of layer two (L2) technologies, including Ethernet, Gigabit Ethernet (GigE), and Synchronous Optical Networking (SONET) interfaces located on a PIC (not shown) of forwarding unit 25A, for instance. In various aspects, each of forwarding units 25 may include more or fewer IFCs. In some examples, each of packet processors 59 is associated with different IFCs of the forwarding unit on which the forwarding component is located. The switch fabric (again, not shown) connecting forwarding units 25 provides a high-speed interconnect for forwarding incoming transit network packets to the selected one of forwarding units 25 for output over a network interface of an IFC 26 of the selected forwarding unit.

Network device 30 may in some instances represent a multi-chassis router, and the switch fabric may include a multi-stage switch fabric, such as a 3- or 5-stage Clos switch fabric, that relays packet-switched communications and circuit-switched communications between the routing nodes of the multi-chassis router via optical interconnects using multiplexed communications. An example multi-chassis router that employs optical interconnects using multiplexed communications is described in U.S. Pat. No. 8,050,559, entitled MULTI-CHASSIS ROUTER WITH MULTIPLEXED OPTICAL INTERCONNECTS, issued Nov. 1, 2011, the entire contents of which being incorporated by reference herein.

Forwarding units 25A-25N of network device 30 demarcate control plane 8 and data plane 10 of network device 30. That is, forwarding unit 25A performs functions of both control plane 8 and data plane 10. In general, packet processor 59A and IFCs 26A, 26B implement data plane 10 for forwarding unit 25A, while forwarding unit processor 62 (illustrated as "fwdg. unit processor 62") executes software that implements portions of control plane 8 within forwarding unit 25A. Control unit 40 also implements portions of control plane 8 of network device 30. Forwarding unit processor 62 of forwarding unit 25A manages packet processor 59A and executes instructions to provide an interface 63 to control unit 40 receive process inter-plane communications and handle host-bound or other local/exception network packets (such as packets that include Options Field values or TTL-expired packets). Interface 63 may further provide an interface by which forwarding unit 25A receives at least part of FIB 42 for installation to memory 57A as FIB 48A and maintains FIB 48A. Forwarding unit processor 62 may represent a general- or special-purpose processor, microprocessor, or controller capable of executing instructions. Forwarding unit processor 62 may execute a microkernel for forwarding unit 25A.

Memory 57A of forwarding unit 25A represents one or more computer-readable storage media, such as one or more instances of Random Access Memory (RAM), e.g., Static RAM (SRAM), Dynamic RAM (DRAM), and/or Reduced Latency DRAM (RLDRAM). In some examples, packet processor 59A and memory 57A may represent or include a Content Addressable Memory (CAM) such as Tertiary CAM (TCAM). Although illustrated as separate from packet processor 59A, at least a portion of memory 57A may in some cases be internal memory for the packet processor 59A.

Memory 57A stores FIB 48A received by interface 63 from control plane 8. In the illustrated example, kernel 43 installs to memory 57A at least a part of FIB 42 including next hops 35 to FIB 48A including next hops 35'.

Packet processor 59A may represent a packet-forwarding integrated circuit (IC), e.g., one or more programmable ASICs or ASIC-based packet processors, that processes network packets by performing a series of operations on each packet over respective internal packet forwarding paths as the packets traverse the internal architecture of network device 30. Packet processor 59A processes packets in accordance with next hop instructions 35' ("next hops 35'"). A next hop 35' is a data structure stored to FIB 48A that either contains the final result of packet processing for a packet or acts as a link to another lookup for the same packet. Next hops 35' correspond to next hops 35 of FIB 42.

Packet processor 59A accesses next hops 35' stored to FIB 48A that, when executed, cause packet processor 59A to examine the contents of each packet (or another packet property, e.g., incoming interface on which the network device received the packet) and on that basis make forwarding decisions, apply filters, and/or perform accounting, management, traffic analysis, and load balancing, for example. In one example, packet processor 59A stores next hops 35' as next hop data chained together (or otherwise arranged) as a series of next hops along an internal packet forwarding path for the network device 30. The result of packet processing determines the manner in which a packet is forwarded or otherwise processed by packet processors 59 from its input interface on one of forwarding units 25 to its output interface on one of forwarding units 25 (the same forwarding unit 25 may have both the input and output interface for a given packet).

Each of next hops 35' may represent a final, intermediate, starting, or extended next hop, for instance. A "final next hop" contains information on the final destination of the packet. An "intermediate next hop" is a link to the next lookup step and contains a command specifying the lookup algorithm type, a memory address pointer to the beginning of the lookup data structure, and an optional pointer offset for moving the current key pointer to a different key buffer field. An "extended next hop" is a special type of intermediate next hop that contains a memory address pointer to a list of instructions (more than one next hop can be pointing to the same list). These instructions specify whether to modify certain fields in the key buffer and may place lookup results in the result buffer. The list can end with an intermediate next hop, a final next hop or without a next hop (where no next hop is specified, the lookup process ends and the current contents of the result buffer are used as the result). A "starting next hop" is the next hop specifying the first lookup step for a packet and is either of the form of a final next hop or an intermediate next hop. Starting next hops may be stored in a starting hop table. Additional details regarding next hops and an example forwarding architecture are described in U.S. Pat. No. 7,215,637, "Systems and methods for processing packets," issued May 8, 2007; and in PLATFORM-INDEPENDENT CONTROL PLANE AND LOWER-LEVEL DERIVATION OF FORWARDING STRUCTURES, U.S. application Ser. No. 12/266,298, filed Nov. 6, 2008; each of which being incorporated herein by reference in its entirety.

In accordance with the techniques described in this disclosure, routing process 66A associates multiple next hops 35 for logical network structures having a common attribute into one of associations 47 (illustrated as "assocs. 47"). An example association 47A including multiple next hops 35 is illustrated in FIB 42. Each of associations 47 is identifiable by an association identifier and including a subset of the set of next hops 35 represented by the association. In some examples, each of associations 47 is an object or other data structure usable by components of network device 30 to track a set of associated next hops. In some examples, each of next hops 35 that is a member of an association includes a field identifying the association for the next hop.

Routing process 66A may create associations due to a protocol, e.g., RSVP 53A, requesting an association in response to determining an association among corresponding logical network structures having a common attribute. For example, RSVP 53A may determine that multiple LSPs have a common backup LSP or common output interface and request an association for the next hops 35 by which network device 30 implements the multiple LSPs.

Routing process 66A may install, to FIB 42 of kernel 43, next hops in a group of next hops 35 having an association in conjunction with an association identifier for the group of next hops 35. For example, routing process 66A may send, via socket 67 to kernel 43, each next hop in association 47A together with an identifier for association 47A. Kernel 43 stores the association identifier for association 47A to FIB 42 along with the next hops that are members of the association 47A. Kernel 43, in turn, may install to FIB 48A next hops in a group of next hops 35 having an association in conjunction with an association identifier for the group of next hops 35. In the illustrated example, kernel 43 issues one or more next hop install messages 69 via communication link 51 that specify the next hops and the association identifier for the next hop. Each of the one or more next hop install messages may represent, e.g., a route table or other installation or "add" message that specifies a next hop and is extended in accordance with techniques of this disclosure to include an association identifier for the next hop. In the illustrated example, the one or more next hop install messages cause the interface 63 to store, to memory 57A, a group of next hops 35' in association with an association identifier for association 47A. In some examples, association module 28 executed by forwarding unit processor 62 may manage the association of the next hops 35' that a members of association 47A. In other words, the forwarding unit 25A stores a mapping of the association identifier for association 47A to each of the next hops 35' that are members of association 47A. In some cases, routing process 66A provides multiple next hops to kernel 43 together with an indication that such next hops are associated. In such cases, kernel 43 may create an association object or otherwise generate state that associates the next hops such that the next hops may be collectively identified according to their association.

Subsequently, routing process 66A may determine to collectively modify each of the next hops 35 that are members of association 47A. For example and as described in further detail below with respect to FIGS. 4A-4C, next hops 35 that are members of association 47A may cause packet processor 59A to execute operations for forwarding packets on LSPs that are now broken or otherwise obsolete. Consequently, routing process 66A may collectively delete such next hops in cooperation with kernel 43 and association module 28. As another example, routing process 66A may collectively modify all next hops that are members of association 47A to have a new result. Example modification operations include update/modify and delete. In some examples, routing process 66A may collectively read a set of next hops in an association from FIB 42 and/or FIB 48A. In some examples, routing process 66A may collectively create a set of next hops in an association for storage to FIB 42 and/or FIB 48A. As used herein, "collectively modify" refers to the modification of multiple next hops by virtue of an association for the next hops. Collectively modification may be signaled by sending the association identifier rather than separately sending identifiers for each next hop in the association of next hops.

To signal the collective modification of the next hops 35 that are members of association 47A, routing process 66A sends a modify next hops message 71 to kernel 43. Modify next hops message 71 specifies an operation and the association identifier for association 47A. Kernel 43 directs modify next hop message via communication links 51 to forwarding unit 25 as modify next hops message 71'.

In response to receiving modify next hops message 71', association module 28 performs the specified operation with respect to all next hops of next hops 35' that are members of the association 47A identified by the specified association identifier. In other words, association module 28 obtains the operation and the association identifier from modify next hops message 71', determines the next hops of next hops 35' that are members of the association 47A identified by the association identifier, and performs the operation with respect to each of the next hops in the association. In some examples, the operation is a delete operation. In such cases, association module 28 determines all of the next hops of next hops 35' that are members of associations 47A and deletes them from the FIB 48A. In this way, routing process 66A may avoid separately sending an instruction for each of the multiple next hops in association 47A and thus reduce messaging overhead between routing process 66A and kernel 43 and also between kernel 43 and forwarding unit 25A.

In some examples, to determine the next hops of next hops 35' that are members of the association 47A identified by the association identifier specified in modify next hops message 71', association module 28 reads an association object from memory 57A for association 47A. The association object lists or otherwise identifies each of the next hops in the association 47A.

Figure 3:
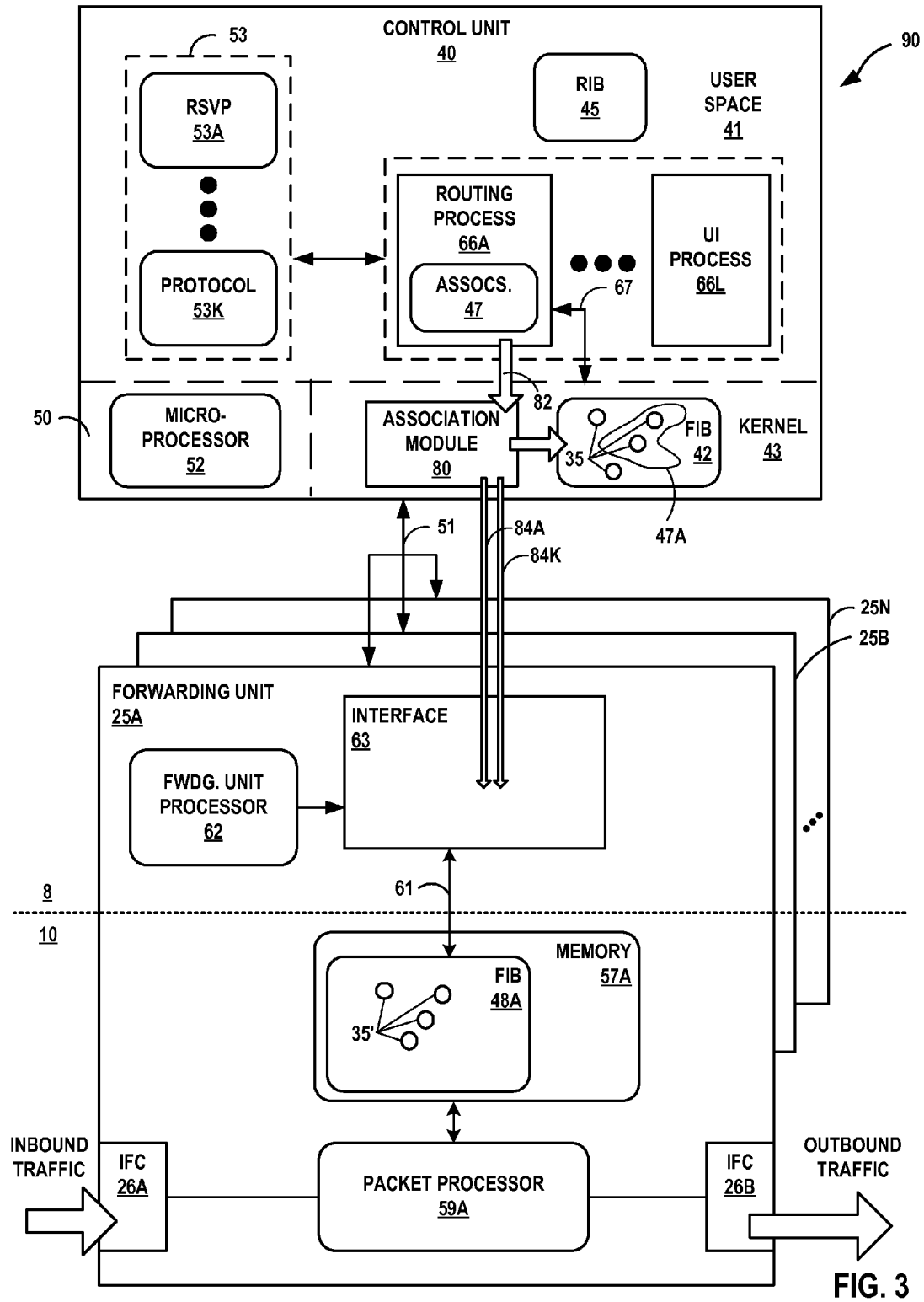
FIG. 3 is a block diagram illustrating, in detail, components of an example network device that signal and perform operations with respect to associations of multiple next hops, as described herein.

FIG. 3 is a block diagram illustrating, in detail, components of an example network device that signal and perform operations with respect to associations of multiple next hops, as described herein. Network device 90 illustrated in FIG. 3 may represent an example instance of router 12B of FIG. 1. Network device 90 includes many components in common with network device 30 of FIG. 2, these common components performing operations substantively similar in both network devices 90, 30. However, whereas network device 30 includes association module 28 of forwarding unit 25A to manage and perform operations with respect to associations 47 according to techniques describes above with respect to FIG. 2, kernel 43 of network device 90 includes an association module 80 to manage and perform operations with respect to associations 47.

Routing process 66A may install, to FIB 42 of kernel 43, next hops in a group of next hops 35 having an association in conjunction with an association identifier for the group of next hops 35. For example, routing process 66A may send, via socket 67 to kernel 43, each next hop in association 47A together with an identifier for association 47A. Association module 80 of kernel 43 may store the association identifier for association 47A to FIB 42 along with the next hops that are members of the association 47A. Association module 80 may separately store an association object that is identifiable by the association identifier for association 47A and that lists or otherwise enables association module 80 to determine each of the next hops in next hops 35 that is a member of association 47A. Kernel 43 may replay any of next hops 35 to routing process 66A and include, in the replay messages, the association identifier for the replayed next hops. In such examples, routing process 66A may avoid storing a separate association data structure (e.g., associations 47).

Subsequently to routing process 66A installing next hops 35 of association 47A to FIB 42, routing process 66A may determine to collectively modify each of the next hops 35 that are members of association 47A. For example and as described in further detail below with respect to FIGS. 4A-4C, next hops 35 that are members of association 47A may cause packet processor 59A to execute operations for forwarding packets on LSPs that are now broken or otherwise obsolete. Consequently, routing process 66A may collectively delete such next hops in cooperation with association module 80. As another example, routing process 66A may collectively modify all next hops that are members of association 47A to have a new result. Example modification operations include update/modify and delete. In some examples, routing process 66A may collectively read a set of next hops in an association from FIB 42. In some examples, routing process 66A may collectively create a set of next hops in an association for storage to FIB 42.

To signal the collective modification of the next hops 35 that are members of association 47A, routing process 66A sends a modify next hops message 82 to kernel 43. Modify next hops message 82 specifies an operation and the association identifier for association 47A.

In response to receiving modify next hops message 82, association module 80 performs the specified operation with respect to all next hops of next hops 35 that are members of the association 47A identified by the specified association identifier. In other words, association module 80 obtains the operation and the association identifier from modify next hops message 82, determines the next hops of next hops 35 that are members of the association 47A identified by the association identifier, and performs the operation with respect to each of the next hops in the association. In some examples, the operation is a delete operation. In such cases, association module 80 determines all of the next hops of next hops 35 that are members of associations 47A and deletes them from the FIB 42. In this way, routing process 66A may avoid separately sending an instruction for each of the multiple next hops in association 47A and thus reduce messaging overhead between routing process 66A and kernel 43. In some examples of network device 30 of FIG. 2, network device 30 may also include an association module 80 in kernel 43 such that association module 80 may collectively modify next hops 35 in FIB 42 by association.

In some examples, to determine the next hops of next hops 35 that are members of the association 47A identified by the association identifier specified in modify next hops message 82, association module 80 reads an association object from memory for association 47A. The association object lists or otherwise identifies each of the next hops in the association 47A.

In addition to collectively modifying the next hops 35 in association 47A, association module 80 may send respective modify next hop messages 84A-84K (collectively, "modify next hop messages 84") to forwarding unit 25A. Each of modify next hop messages 84 identifies a different next hop in next hops 35' of FIB 48A and specifies an operation to be performed by forwarding unit processor 62 with respect to the identified next hop. For example, modify next hop message 84A may direct forwarding unit processor 62 to delete one of next hops 35'. In other words, association module 80 may send a different modify next hop message 84 for each next hop 35' in association 47A, in the illustrated example.

The techniques described above with respect to network devices 30, 90 of FIGS. 2-3 may reduce the amount of message traffic on socket 67 and the concomitant message processing overhead on control unit 40. This may have the effect of improving scalability of various protocols 53 executed by routing process 66A. For example, routing process 66A may improve RSVP 53A scaling by leveraging internal associations among state (e.g., next hops corresponding to logical network structures of a network, the logical network structures having inherent associations) being messaged to reduce internal messaging inefficiencies between routing process 66A and kernel 43 and/or between kernel 43 and forwarding unit 25A.

Figure 4C:
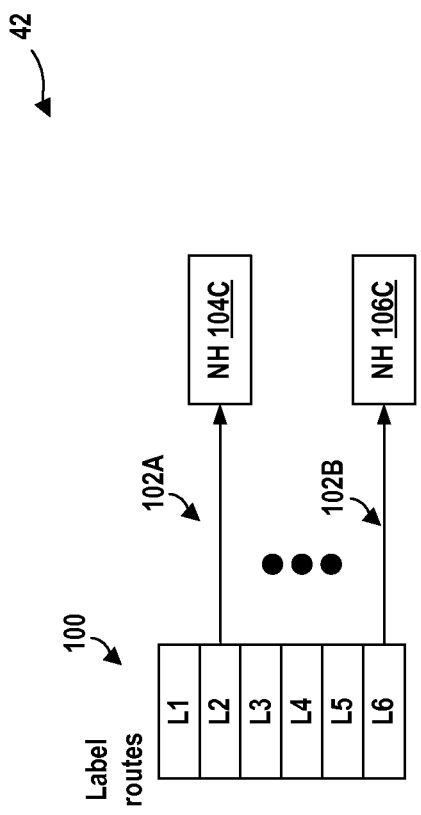

FIGS. 4A-4C are block diagrams illustrating the modification of a FIB by collective modification of an association of next hops, according to techniques described herein. FIG. 4A illustrates a portion of FIB 42 that includes forwarding structures for implementing multiple LSPs that have a common attribute. In some examples, the portion of FIB 42 may implement LSPs 20A, 20B of FIG. 1, which are bypass-protected LSPs having a common bypass tunnel 17.

Lookup table 100 includes entries or "routes" for each of incoming LSP labels L1-L6, with each entry specifying a next hop as a result 102 and determining a forwarding path for packets that match the LSP label of the entry. In this example, incoming LSP label L2 has result 102A that is a unilist next hop 104A ("NH 104A"), and incoming LSP label L6 has result 102B that is a unilist next hop 104B ("NH 106A"). A unilist next hop specifies a list of next hops and may permit a rapid transition to a subsequent next hop in the list. Next hop 104A lists next hop 104B and next hop 104C. Next hop 106A lists next hop 106B and next hop 106C.

In pseudocode, the routes for LSP labels L2 (for instance) may take the following form:

```
L(old-incoming)->UnilistNH1    ->UnicastNH2(SWAP L(outgoing))
                               ->UnicastNH3(PUSH(BypassLabel)
                                          SWAP L(IncomingLabelAtMP)))
``` where L(old-incoming) is L2, UnilistNH1 represents NH 104A, UnicastNH2 represents NH 104B, and UnicastNH3 represents NH 104C. SWAP refers to a label swap operation and PUSH refers to a label push operation. L(IncomingLabelAtMP) may represent the label expected at the merge point (e.g., router 12D for LSP tunnels 20A-20B in FIG. 1).

According to techniques described herein, next hops 104A, 106A are members of association 108; and next hops 104B, 106B are members of association 109. Associations 108, 109 may be example instances of associations 47 of FIGS. 2-3. Each of associations 108, 109 has a corresponding association identifier by which components of a network device may signal one another to identify the association.

Next hops 104B, 106B may each cause the network device that implements FIB 42 to output labeled packets over a common outbound interface (e.g., interface port 16D in the example of FIG. 1). FIG. 4B illustrates modifications to FIB 42 upon failure of the link or network device coupled to the common outbound interface. Initially, the forwarding unit 25 switches to next hops 104C, 106C to output traffic over the bypass tunnel 17 rather than the failed interface for LSPs 20. Routing process 66A may receive an interface down message from, e.g., kernel 43, and RSVP 53A may responsively initiate forwarding state cleanup of the LSPs 20 that used the broken interface. Specifically, routing process 66A sends a message via socket 67 to modify the FIB 42 to change the label route lookups results 102 to the backup next hops 104C, 106C.

RSVP 53A may initiate processing to delete state hanging off of the now-down interface. This state in the example of FIG. 4B is no longer part of the forwarding paths for the routes and includes the next hops 104B, 106B and may further include next hops 104A, 106A for LSPs 20 that were using the bypass tunnel 17. Rather than sending individual next hop delete messages to delete each of next hops 104A, 106A, however, routing process 66A sends to kernel 43 a single modify next hops message that specifies the delete operation and an identifier for association 108. Likewise, routing process 66A sends to kernel 43 another modify next hops message that specifies the delete operation and an identifier for association 109. The modify next hop messages may not separately identify the next hops 104A, 106A and next hops 104B, 106B. Kernel 43 may, in response, execute techniques described above to delete all next hops that are members of associations 108, 109. FIG. 4C illustrates FIB 42 with next hops 104A, 106A and next hops 104B, 106B deleted. FIB 42 or a portion thereof may be replicated to FIBs 48A-48N. When executed by network device 30 of FIG. 2, the above techniques may be applied directly to FIB 48A, rather than to FIB 42.

RSVP 53A may perform global repair to make new LSP instances for LSPs 20, break the old LSP instances, and to add bypass protection for the new LSP instances. Failure to timely process such messages may cause delay in processing by the forwarding unit 25A, delay in receiving acknowledgement messages at kernel 43 from forwarding unit 25A, and eventually may result in delaying sending RESV upstream for the LSPs 20 being repaired, which may cause the ingress LER for the LSPs 20 to abandon Make-Before-Break (MBB) signaling and restart signaling for newer MBB instances. By performing the above techniques, a network device 30, 90 may reduce an amount of message traffic on socket 57 and improve an ability of the routing process 66A to timely process inter-device RSVP signaling messages for global repair. This may have the salutary effect to reducing the overall number of LSP signaling messages in the network and, in some cases, reduce LSP signaling failures.

Further, while the above example is described for purposes of illustration in the context of a link or node failure and a bypass tunnel that provides link or node protection, the techniques of this disclosure are also applicable to other situations in which multiple next hops have an inherent association by virtue of implementing corresponding, associated logical network structures in a network.

Figure 5:
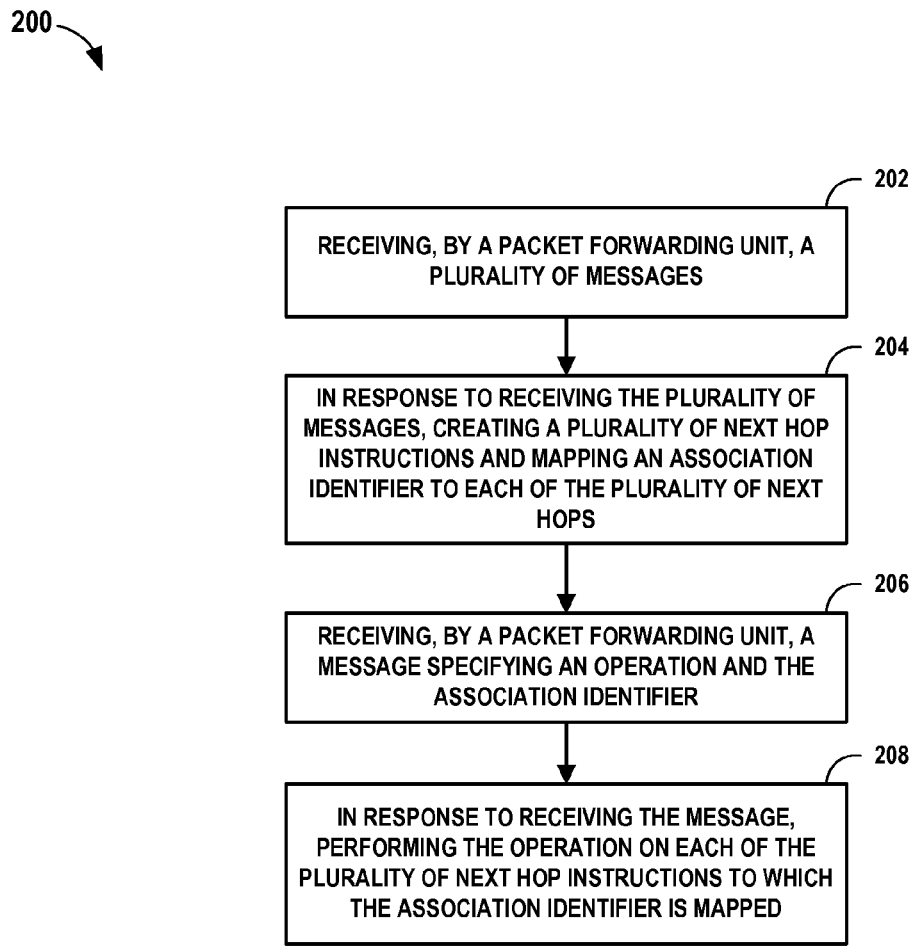
FIG. 5 is a flowchart illustrating an example mode of operation of a network device to signal and perform operations with respect to associations of multiple next hops according to techniques described in this disclosure.

FIG. 5 is a flowchart illustrating an example mode of operation of a network device to signal and perform operations with respect to associations of multiple next hops according to techniques described in this disclosure. Mode of operation 200 is described with respect to example network device 30 of FIG. 2.

Forwarding unit 25A receives a plurality of messages each directing forwarding unit 25A to add a different next hop mapped to an association identifier (202). In response, forwarding unit 25A adds (or creates) the next hops to FIB 48A and maps the association identifier for association 47A to each of the next hops (204).

Forwarding unit 25A subsequently receives modify next hops message 71' that specifies an operation and the association identifier for association 47A (206). In response to receiving modify next hops message 71', forwarding unit 25A performs the operation on each of the next hops to which the association identifier for association 47A is mapped (208).

Figure 6:
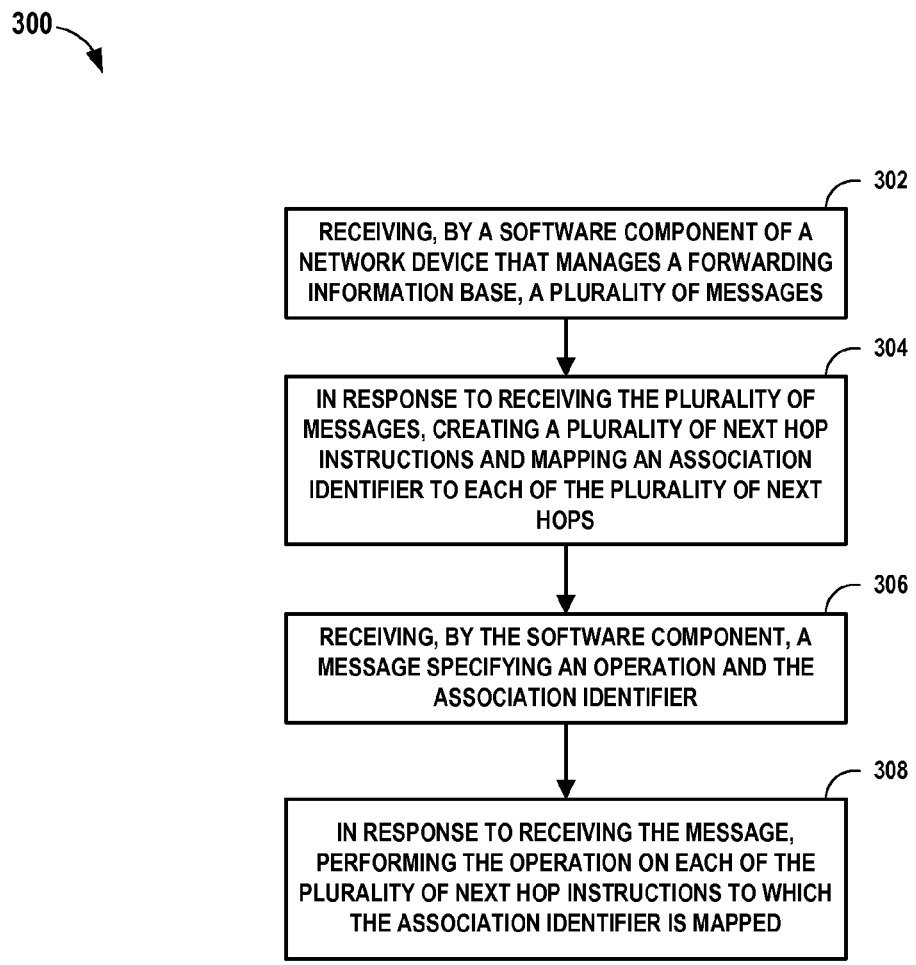
FIG. 6 is a flowchart illustrating an example mode of operation of a network device to signal and perform operations with respect to associations of multiple next hops according to techniques described in this disclosure.

FIG. 6 is a flowchart illustrating an example mode of operation of a network device to signal and perform operations with respect to associations of multiple next hops according to techniques described in this disclosure. Mode of operation 300 is described with respect to example network device 90 of FIG. 3.

In this example of network device 90, kernel 43 is a software component of network device 90 that receives, from routing process 66A, a plurality of messages each directing kernel 43 to add a different next hop mapped to an association identifier (302). In response, kernel 43 adds (or creates) the next hops to FIB 42 and maps the association identifier for association 47A to each of the next hops (304).

Forwarding unit 25A subsequently receives modify next hops message 82 that specifies an operation and the association identifier for association 47A (306). In response to receiving modify next hops message 82, kernel 43 performs the operation on each of the next hops to which the association identifier for association 47A is mapped (308).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   storing, by a first component of a network device of a network, a plurality of next hop instructions corresponding to respective logical or physical network structures of the network;
   determining, by a second component of the network device, the respective logical or physical network structures of the network corresponding to the plurality of next hop instructions have a common attribute;
   determining, by the second component of the network device based on the common attribute, an association of the plurality of next hop instructions and associating an association identifier with the association of the plurality of next hop instructions;
   sending, by the second component of the network device to the first component of the network device, a message that specifies (1) the association identifier that identifies the association of the plurality of next hop instructions and (2) an instruction to delete next hop instructions in the association identified by the association identifier; and
   deleting, by the first component of the network device in response to receiving the message and identifying the plurality of next hop instructions in the association identified by the association identifier, each of the plurality of next hop instructions.

2. The method of claim 1,
   wherein the first component of the network device comprises a kernel of the network device that stores the plurality of next hop instructions to a forwarding information base, and
   wherein the second component of the network device comprises a routing protocol process.

3. The method of claim 1,
   wherein the first component of the network device comprises a packet forwarding unit of the network device that stores the plurality of next hop instructions to a hardware forwarding information base, and
   wherein the second component of the network device comprises a kernel of the network device that stores the plurality of next hop instructions to a software forwarding information base.

4. The method of claim 1, further comprising:
   storing, by the first component of the network device, an association object mapped to each of the plurality of next hop instructions.

5. The method of claim 4,
   wherein the association identifier identifies the association object, and
   wherein modifying each of the plurality of next hop instructions comprises determining, by the first component of the network device based on the association identifier, the association object and mapping the association object to each of the plurality of next hop instructions.

6. The method of claim 1,
   wherein deleting each of the plurality of next hop instructions comprises performing, by the first component of the network, the instruction to delete on each of the plurality of next hop instructions.

7. The method of claim 1, further comprising:
   receiving, by the network device, configuration information for a plurality of label switched paths, wherein the logical or physical network structures of the network comprise the plurality of label switched paths; and
   sending, by the second component of the network device to the first component of the network device, a plurality of messages that each specifies a next hop instruction of the plurality of next hop instructions and specifies the association identifier.

8. The method of claim 7, wherein the common attribute comprises at least one of a bypass label switched path, outbound interface, outbound next hop device, and outbound tunnel.

9. The method of claim 7,
   wherein sending the message comprises sending, by the second component to the first component in response to determining the common attribute has failed, the message.

10. A network device of a network, the network device comprising:
    a first component configured to store a plurality of next hop instructions corresponding to respective logical or physical network structures of the network; and
    a second component configured to:
    determine the respective logical or physical network structures of the network corresponding to the plurality of next hop instructions have a common attribute;
    determine, based on the common attribute, an association of the plurality of next hop instructions and associating an association identifier with the association of the plurality of next hop instructions;
    send, to the first component, a message that specifies (1) the association identifier that identifies the association of the plurality of next hop instructions and (2) an instruction to delete next hop instructions in the association identified by the association identifier,
    wherein the first component is further configured to delete, in response to receiving the message and identifying the plurality of next hop instructions in the association identified by the association identifier, each of the plurality of next hop instructions.

11. The network device of claim 10,
    wherein the first component of the network device comprises a kernel of the network device, the kernel configured to store the plurality of next hop instructions to a forwarding information base, and
    wherein the second component of the network device comprises a routing protocol process.

12. The network device of claim 10,
wherein the first component of the network device comprises a packet forwarding unit of the network device, the packet forwarding unit configured to store the plurality of next hop instructions to a hardware forwarding information base, and
wherein the second component of the network device comprises a kernel of the network device, the kernel configured to store the plurality of next hop instructions to a software forwarding information base.

13. The network device of claim 10, wherein the first component is further configured to store an association object mapped to each of the plurality of next hop instructions.

14. The network device of claim 13,
wherein the association identifier identifies the association object, and
wherein to modify each of the plurality of next hop instructions the first component is further configured to determine, based on the association identifier, the association object and to map the association object to each of the plurality of next hop instructions.

15. The network device of claim 10,
wherein to delete each of the plurality of next hop instructions the first component is further configured to perform the instruction to delete on each of the plurality of next hop instructions.

16. The network device of claim 10,
wherein the network device is configured to receive configuration information for a plurality of label switched paths, wherein the logical or physical network structures of the network comprise the plurality of label switched paths, and
wherein the second component is configured to send, to the first component, a plurality of messages that each specifies a next hop instruction of the plurality of next hop instructions and specifies the association identifier.

17. The network device of claim 16, wherein the common attribute comprises at least one of a bypass label switched path, outbound interface, outbound next hop device, and outbound tunnel.

18. The network device of claim 16,
wherein to send the message the second component is further configured to send, to the first component in response to determining the common attribute has failed, the message.

19. A non-transitory computer-readable medium comprising instructions for causing at least one programmable processor of a network device of a network to:
store, by a first component of the network device, a plurality of next hop instructions corresponding to respective logical or physical network structures of the network;
determine, by a second component of the network device, the respective logical or physical network structures of the network corresponding to the plurality of next hop instructions have a common attribute;
determine, by the second component of the network device based on the common attribute, an association of the plurality of next hop instructions and associating an association identifier with the association of the plurality of next hop instructions;
send, by the second component of the network device to the first component of the network device, a message that specifies (1) the association identifier that identifies the association of the plurality of next hop instructions and (2) an instruction to delete next hop instructions in the association identified by the association identifier; and
delete, by the first component of the network device in response to receiving the message and identifying the plurality of next hop instructions in the association identified by the association identifier, each of the plurality of next hop instructions.

20. The non-transitory computer-readable medium of claim 19,
wherein the first component of the network device comprises a kernel of the network device that stores the plurality of next hop instructions to a forwarding information base, and
wherein the second component of the network device comprises a routing protocol process.

21. The non-transitory computer-readable medium of claim 19,
wherein the first component of the network device comprises a packet forwarding unit of the network device that stores the plurality of next hop instructions to a hardware forwarding information base, and
wherein the second component of the network device comprises a kernel of the network device that stores the plurality of next hop instructions to a software forwarding information base.

* * * * *